United States Patent
Sato (10) Patent No.: US 11,433,898 B2
(45) Date of Patent: Sep. 6, 2022

(54) DRIVING CONTROL APPARATUS FOR VEHICLE

(71) Applicant: SUZUKI MOTOR CORPORATION, Hamamatsu (JP)

(72) Inventor: Katsuhiko Sato, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 0 days.

(21) Appl. No.: 16/828,663

(22) Filed: Mar. 24, 2020

(65) Prior Publication Data

US 2020/0307600 A1 Oct. 1, 2020

(30) Foreign Application Priority Data

Mar. 27, 2019 (JP) .............................. JP2019-060686

(51) Int. Cl.
| | | |
|---|---|---|
| *B60W 30/18* | (2012.01) | |
| *B60W 10/04* | (2006.01) | |
| *B60W 10/20* | (2006.01) | |
| *B60W 50/14* | (2020.01) | |

(52) U.S. Cl.
CPC ...... *B60W 30/18163* (2013.01); *B60W 10/04* (2013.01); *B60W 10/20* (2013.01);
(Continued)

(58) Field of Classification Search
CPC .............................................. B60W 30/18163
See application file for complete search history.

(56) References Cited

U.S. PATENT DOCUMENTS

| 8,577,553 B2 | 11/2013 | Nitta et al. |
| 9,637,107 B2 | 5/2017 | Matsuno et al. |

(Continued)

FOREIGN PATENT DOCUMENTS

| DE | 102016009709 | 2/2017 |
| JP | 2009-149255 | 7/2009 |

(Continued)

OTHER PUBLICATIONS

Office Action dated Jun. 17, 2021 issued in India Patent Application No. 202014009396.
(Continued)

*Primary Examiner* — Elaine Gort
*Assistant Examiner* — Tarek Elarabi
(74) *Attorney, Agent, or Firm* — Cozen O'Connor (57) ABSTRACT

A driving control apparatus for a vehicle having a function for generating a target path to a predetermined range as a target and performing automated lane change to a neighboring lane when no other vehicle is recognized in the predetermined range of the neighboring lane by a surrounding recognition function and a merging support function for generating a target path using other vehicle information obtained by a communication function, performing acceleration/deceleration control and steering control, and automatically merging to a merged lane, wherein the driving control apparatus has a function for altering override threshold values serving as a determination criterion of operation intervention for stopping the acceleration/deceleration control and the steering control to a value greater than during normal operation of the communication function when failure occurs in the communication function during the automated merging.

9 Claims, 5 Drawing Sheets

(52) U.S. Cl.
CPC ..... *B60W 50/14* (2013.01); *B60W 2554/4049* (2020.02); *B60W 2710/20* (2013.01)

(56) References Cited

U.S. PATENT DOCUMENTS

| | | | |
|---|---|---|---|
| 9,665,779 | B2 | 5/2017 | Ooi |
| 9,809,164 | B2 | 11/2017 | Matsuno et al. |
| 2017/0018189 | A1 | 1/2017 | Ishikawa |
| 2017/0240172 | A1 | 9/2017 | Nishiguchi et al. |
| 2018/0023951 | A1 | 1/2018 | Seo et al. |
| 2018/0037216 | A1 | 2/2018 | Otake |
| 2018/0273027 | A1 | 9/2018 | Tomozawa et al. |
| 2019/0071099 | A1 | 3/2019 | Nishiguchi |
| 2019/0227546 | A1 | 7/2019 | Sato |
| 2020/0070827 | A1* | 3/2020 | Choi ................ B60W 30/12 |
| 2020/0079377 | A1* | 3/2020 | Yashiro ........... B60W 60/0053 |

FOREIGN PATENT DOCUMENTS

| | | |
|---|---|---|
| JP | 2012-096569 | 5/2012 |
| JP | 2013-232079 | 11/2013 |
| JP | 2015-022423 | 2/2015 |
| JP | 2016-004443 | 1/2016 |
| JP | 2016-088383 | 5/2016 |
| JP | 2016-097827 | 5/2016 |
| JP | 2018-022365 | 2/2018 |
| JP | 2018-030479 | 3/2018 |
| JP | 2018-151287 | 9/2018 |
| JP | 2018-158684 | 10/2018 |
| JP | 2018-203121 | 12/2018 |
| JP | 2019-051894 | 4/2019 |
| JP | 2019-127136 | 8/2019 |
| WO | WO 2009/086857 | 7/2009 |

OTHER PUBLICATIONS

Notice of Allowance dated Apr. 4, 2022 issued in U.S. Appl. No. 17/030,339.

Preliminary Search Report dated Aug. 26, 2021 issued in French Patent Application No. 2000507.

Office Action dated Oct. 7, 2021 issued in related U.S. Appl. No. 16/597,540.

* cited by examiner

DRIVING CONTROL APPARATUS FOR VEHICLE

FIELD OF THE INVENTION

The present invention relates to a driving control apparatus for a vehicle, and more particularly, relates to a partially automated lane change system and to an automated merging system using road-to-vehicle communication.

DISCUSSION OF THE RELATED ART

A variety of techniques for reducing burdens on drivers and for safe-driving support, for example, adaptive cruise control systems (ACCS) and lane keeping assistance systems (LKAS), have been put into practical use. Furthermore, the practical application and international standardization of a "partially automated in-lane driving system (PADS)," a "partially automated lane change system (PALS)," and an automated merging system using road-to-vehicle communication based on these techniques are being promoted.

Such a driving control system is only for the purpose of driving support and is different from completely automatic driving. A driver is required to place hands on the steering wheel and keep track of the driving situation so as to be able to manually drive at any time, the driver needs to respond in accordance with the situation, and the driving control system has an override function that switches to manual driving by the driver's operation intervention even while the system is operating. Patent Literature 1 discloses a vehicle lateral movement control device that determines change speed (fallback speed) of a fallback control amount to shift to manual driving according to change speed of a steering operation amount input by a driver.

In JP 2012-096569 A, if the change in speed of the steering operation amount is large, it is regarded as steering intervention intended by the driver and driving is shifted to manual driving in a short time, and if the change in speed of the steering operation amount is small, fallback control is performed relatively taking more time, and driving is shifted to manual driving. However, the large change in speed of the steering operation amount does not necessarily mean steering intervention intended by the driver, nor does fallback control corresponding to the change in speed of the steering operation amount necessarily mean control suitable for the movement state of the vehicle.

For example, if road-to-vehicle communication is disrupted due to failure of a road-to-vehicle communicator or communication failure during merging support in an automated merging system using road-to-vehicle communication, the automated merging system tries to continue automated merging (automated lane change) by sensor information of the vehicle itself, but when it cannot continue automated merging by the sensor information due to the movement of other vehicles or the like, a driver is notified of automated lane change function stop advance notice and an operation takeover request, and fallback control of an automated lane change function is started after the elapse of several seconds.

When the driver is notified of the occurrence of communication failure, the automated merging stop, and the operation takeover request, if shift to manual driving is performed due to override by excessive steering operation or override by excessive brake operation/accelerator operation of the driver who is overwhelmed by the notification, the vehicle may get close to a following vehicle or get close to a vehicle in a neighboring lane due to lane departure.

SUMMARY OF THE INVENTION

The present invention has been made in view of the above-described actual situation, and an object is to prevent lane departure and getting close to other vehicles due to excessive operation intervention at the time of occurrence of communication failure during merging support using road-to-vehicle communication.

In order to solve the above-described problems, an embodiment of the present invention is directed to a driving control apparatus for a vehicle, including: an environmental condition estimating part including a surrounding recognition function for recognizing a vehicle's own driving lane and neighboring lanes and other vehicles in the respective driving lanes, a function for obtaining the vehicle's moving state, and a communication function for obtaining other vehicle information in a merged lane; a path generating part for generating a target path on the basis of information obtained by the environmental condition estimating part; and a vehicle control part for performing acceleration/deceleration control and steering control for causing the vehicle to follow the target path. The vehicle control part has a function for generating a target path to a predetermined range as a target and performing automated lane change to a neighboring lane when no other vehicle is recognized in the predetermined range of the neighboring lane by the surrounding recognition function; and a merging support function for generating a target path by using the other vehicle information obtained by the communication function, performing acceleration/deceleration control and steering control, and automatically merging to the merged lane. The driving control apparatus has a function for altering override threshold values serving as a determination criterion of operation intervention for stopping the acceleration/deceleration control and the steering control to a value greater than during normal operation of the communication function when failure occurs in the communication function during the automated merging.

According to the driving control apparatus for the vehicle according to the present invention, because the override threshold value serving as the determination criterion of the operation intervention related to steering and breaking/driving is altered to a value greater than during normal operation of the communication function when fault occurs in the communication function during automated merging, if a driver who is overwhelmed by the notification of automated merging stop and operation takeover due to the occurrence of communication failure performs excessive operation intervention, override can be avoided, which enables shift to fallback control of the merging support function (automated lane change function), can prevent acceleration/deceleration, lane departure, and the like due to excessive operation intervention, and is advantageous in smooth operation takeover.

DETAILED DESCRIPTION FOR THE DRAWINGS

Hereinafter, an embodiment of the present invention will be described in detail with reference to the drawings.

Figure 1:
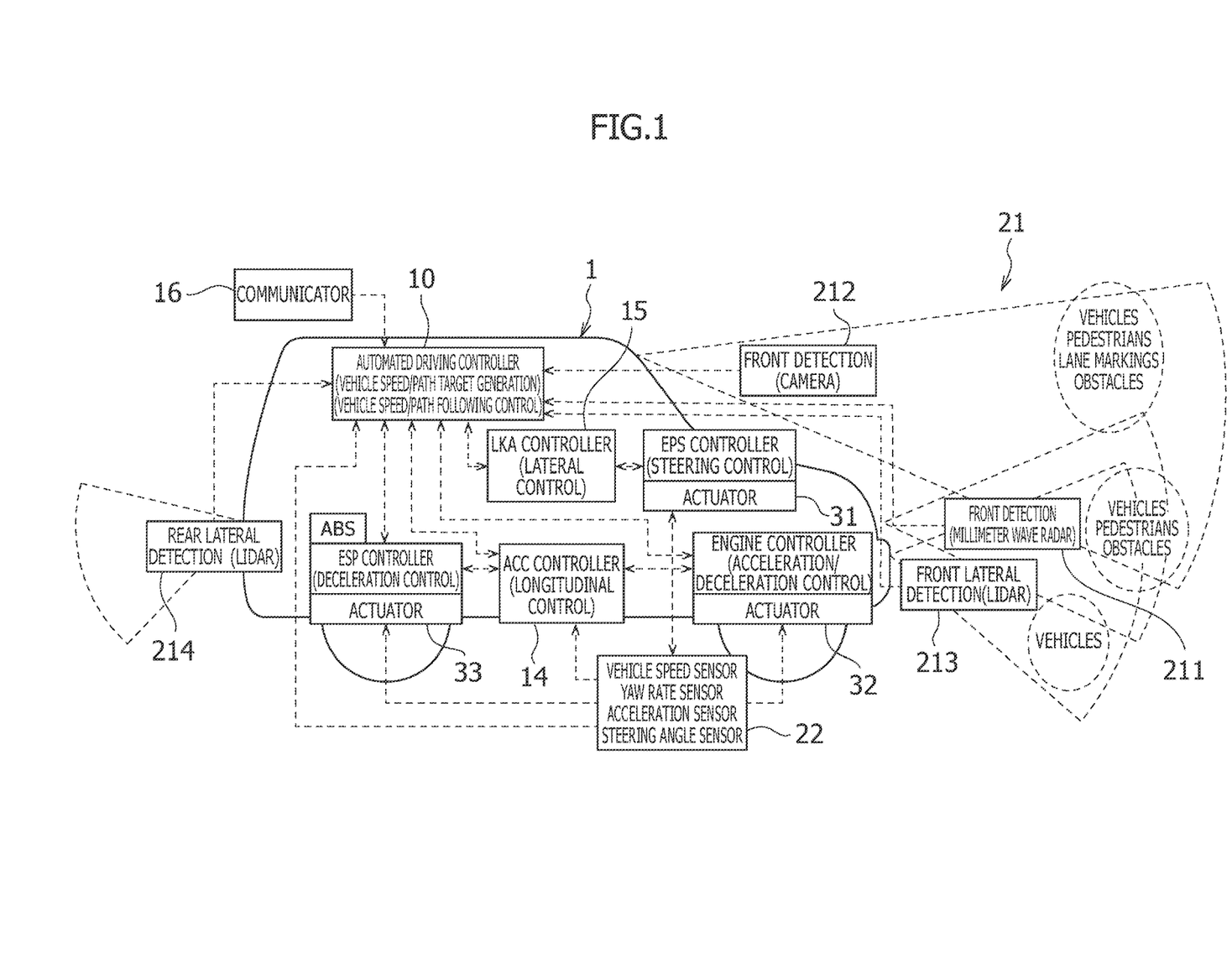
FIG. 1 is a schematic view showing a driving control system of a vehicle.

In FIG. 1, a vehicle 1 equipped with a driving control system according to the present invention includes, in addition to common components, such as an engine and a vehicle body, of an automobile, an external sensor 21 for detecting a vehicle surrounding environment, an internal sensor 22 for detecting vehicle information, a controller/actuator group for speed control and steering control, an ACC controller 14 for inter-vehicle distance control, an LKA controller 15 for lane keeping support control, and an automated driving controller 10 for controlling them, performing path following control, and performing partially automated in-lane driving (PADS), automated lane change (PALS), and later-described automated merging in order to perform, at the vehicle side, recognition, determination, and operation conventionally performed by a driver.

The controller/actuator group for speed control and steering control includes an EPS (Electric Power Steering) controller 31 for steering control, an engine controller 32 for acceleration/deceleration control, and an ESP/ABS controller 33. An ESP (registered trademark; Electronic Stability Program) includes an ABS (Antilock Brake System) to form a stability control system (vehicle behavior stabilization control system).

The external sensor 21 is composed of a plurality of detection means for inputting lane markings on a road defining the vehicle's own driving lane and the neighboring lane, and presence of and relative distance from other vehicles, obstacles, people, and the like around the vehicle into the automated driving controller 10 as image data or point cloud data.

Figure 2:
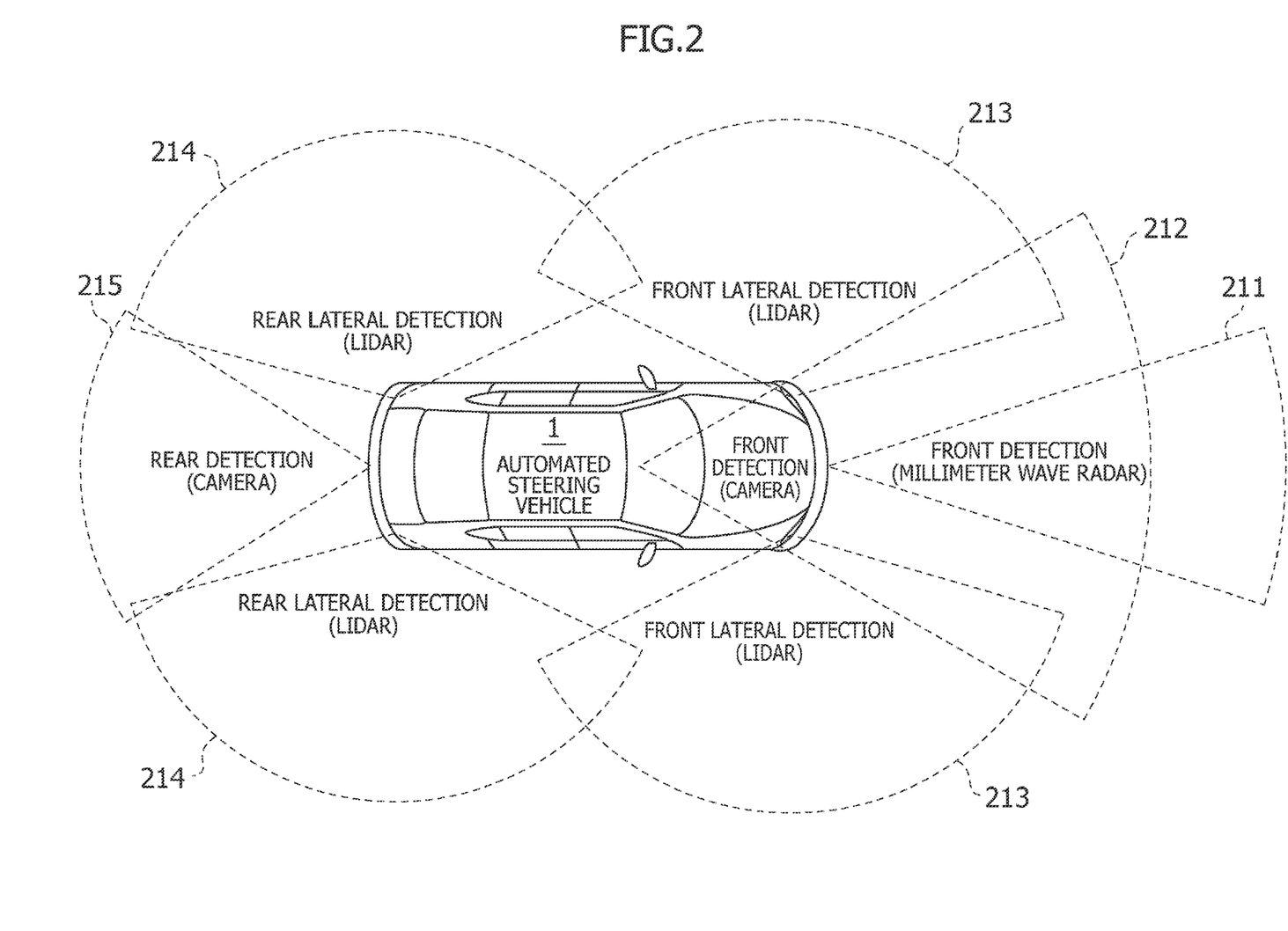
FIG. 2 is a schematic plan view showing an external sensor group of the vehicle.

For example, as shown in FIG. 2, the vehicle 1 includes a millimeter wave radar (211) and a camera (212) as forward detection means 211 and 212, LIDARs (Laser Imaging Detection And Ranging) as front lateral direction detection means 213 and rear lateral direction detection means 214, and a camera (back camera) as rearward detection means 215, covers 360 degrees around the vehicle, and can detect positions of and distance from vehicles, obstacles and the like, and lane marking positions within a predetermined distance in the front, rear, left, and right directions of the vehicle.

Figure 3:
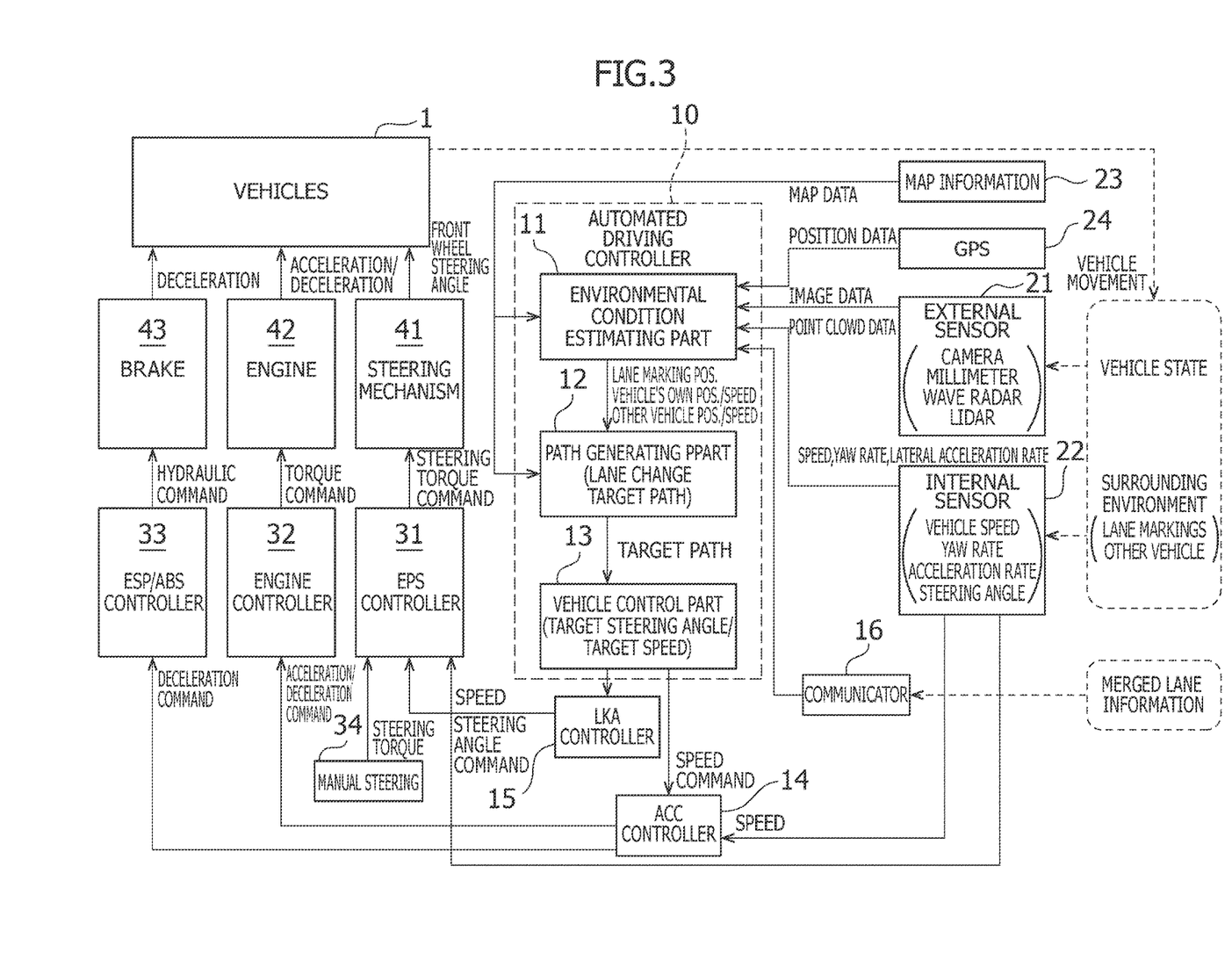
FIG. 3 is a block diagram showing the driving control system of the vehicle.

The internal sensor 22 is composed of a plurality of detection means, such as a vehicle speed sensor, a yaw rate sensor and an acceleration sensor, for measuring physical quantities representing the movement state of the vehicle, and their measurement values are input into the automated driving controller 10, ACC controller 14, LKA controller 15, and EPS controller 31 as shown in FIG. 3.

The automated driving controller 10 includes an environmental condition estimating part 11, a path generating part 12 and a vehicle control part 13, and includes a computer for performing functions as described below, that is, a ROM storing programs and data, a CPU for performing arithmetic processing, a RAM for reading out the programs and data, and storing dynamic data and arithmetic processing results, an input/output interface, and the like.

The environmental condition estimating part 11 acquires the absolute position of the vehicle itself by matching the vehicle's own position information by positioning means 24 such as a GPS and map information, and on the basis of external data such as the image data and point cloud data obtained by the external sensor 21, estimates positions of lane markings of the vehicle's own driving lane and the neighboring lane, and positions and speeds of other vehicles. In addition, it acquires the movement state of the vehicle itself from internal data measured by the internal sensor 22.

The path generating part 12 generates a target path from the vehicle's own position estimated by the environmental condition estimating part 11 to an arrival target. It refers to map information 23 and generates a target path from the vehicle's own position to an arrival target point in lane change on the basis of the positions of the lane markings of the neighboring lane, the positions and speeds of the other vehicles, and the movement state of the vehicle itself estimated by the environmental condition estimating part 11.

The vehicle control part 13 calculates a target speed and a target steering angle on the basis of the target path generated by the path generating part 12, transmits a speed command for constant speed cruise or inter-vehicle distance keeping and following cruise to the ACC controller 14, and transmits a steering angle command for path following to the EPS controller 31 via the LKA controller 15.

The vehicle speed is also input into the EPS controller 31 and ACC controller 14. Because a steering torque changes according to the vehicle speed, the EPS controller 31 refers to a steering angle-steering torque map for each vehicle speed and transmits a torque command to a steering mechanism 41. The engine controller 32, ESP/ABS controller 33, and EPS controller 31 control an engine 42, a brake 43, and the steering mechanism 41, and thereby control movement of the vehicle 1 in a longitudinal direction and a lateral direction.

Outline of Partially Automated in-Lane Driving System and Partially Automated Lane Change System Next, outlines of a partially automated in-lane driving system (PADS) and a partially automated lane change system (PALS) will be explained on the assumption of traveling on a highway.

Partially automated in-lane driving (PADS driving) is enabled in a state in which both ACC controller 14 included in the ACCS and LKA controller 15 included in the LKAS are operating together with the automated driving controller 10.

At the same time as operation of the partially automated in-lane driving system, the automated driving controller 10 (path generating part 12) generates a target path within a single lane and a target speed on the basis of the external information (lanes, vehicle position, and positions and speeds of other vehicles driving in the lane and neighboring lane) obtained by the environmental condition estimating part 11 through the external sensor 21, and the internal information (vehicle speed, yaw rate, and acceleration) obtained by the internal sensor 22.

The automated driving controller 10 (vehicle control part 13) estimates the speed, attitude, and lateral displacement of the vehicle after $\Delta t$ seconds from a relationship between a yaw rate $\gamma$ and lateral acceleration ($d^2y/dt^2$) occurring due to vehicle movement by the vehicle's own position and movement characteristics of the vehicle itself, that is, a front wheel steering angle δ occurring when a steering torque T is applied to the steering mechanism 41 during traveling at a vehicle speed V, gives a steering angle command that makes the lateral displacement to "yt" after Δt seconds to the EPS controller 31 via the LKA controller 15, and gives a speed command that makes the speed to "Vt" after Δt seconds to the ACC controller 14.

Although the ACC controller 14, LKA controller 15, EPS controller 31, engine controller 32, and ESP/ABS controller 33 operate independently of automatic steering, they are also operable according to command input from the automated driving controller 10 while the partially automated in-lane driving function (PADS) and the partially automated lane change system (PALS) are operating.

The ESP/ABS controller 33 that has received a deceleration command from the ACC controller 14 issues a hydraulic command to an actuator and controls braking force of the brake 43 to control the vehicle speed. In addition, an engine controller 32 that has received an acceleration/deceleration command from the ACC controller 14 controls an actuator output (degree of throttle opening) to give the engine 42 a torque command and controls driving force to control the vehicle speed.

The ACC function (ACCS) functions with combination of hardware and software, such as the millimeter wave radar as the forward detection means 211 included in the external sensor 21, ACC controller 14, engine controller 32, and ESP/ABS controller 33.

That is, in a case in which there is no vehicle ahead, the ACC function performs constant speed cruise by setting a cruise control set speed as the target speed; and in a case of having caught up with the vehicle ahead (in a case in which a speed of the vehicle ahead is slower than the cruise control set speed), the ACC function performs following cruise following the vehicle ahead while maintaining an inter-vehicle distance corresponding to a time gap (inter-vehicle time=inter-vehicle distance/speed of vehicle) set in accordance with the speed of the vehicle ahead.

The LKA function (LKAS) detects the lane markings and the vehicle's own position by the environmental condition estimating part 11 of the automated driving controller 10 on the basis of image data obtained by the external sensor 21 (cameras 212 and 215), and performs steering control by the LKA controller 15 and EPS controller 31 so as to be able to drive at a lane center.

That is, the EPS controller 31 that has received the steering angle command from the LKA controller 15 refers to a vehicle speed-steering angle-steering torque map, issues a torque command to an actuator (EPS motor), and gives a front wheel steering angle targeted by the steering mechanism 41.

The partially automated in-lane driving function (PADS) is implemented by combining longitudinal control (speed control and inter-vehicle distance control) by the ACC controller 14 and lateral control (steering control and lane keeping driving control) by the LKA controller 15 as described above.

The partially automated lane change system (PALS) is a system that automatically performs lane change by an instruction or approval of the driver and is implemented by combining longitudinal control (speed control and inter-vehicle distance control) by the ACC controller 14 and lateral control (target path following control by automatic steering) by the LKA controller 15 in the same manner as partially automated driving (PADS driving).

At the same time as activation of the partially automated lane change system, the automated driving controller 10 (path generating part 12) constantly generates a target path for changing the lane from a currently driving lane to a neighboring lane on the basis of the external information (lane markings of the vehicle's own driving lane and the neighboring lane, and positions and speeds of other vehicles driving in the vehicle's own driving lane and the neighboring lane, and speed) obtained by the environmental condition estimating part 11 through the external sensor 21 and the internal information (vehicle speed, yaw rate, and acceleration) obtained by the internal sensor 22.

The automated lane change target path is a path that leads from the currently driving lane to a state of driving at the center of the neighboring lane through lane change; for other vehicles driving in the neighboring lane, their future positions and speeds are predicted, and automated lane change to the neighboring lane by automatic steering is performed if it is determined there is no other vehicle in a predetermined area of the neighboring lane set according to the vehicle's speed and lane change is instructed by the driver's operation of turn signals, a system determination, or the like.

Outline of Automated Merging System Using Road-to-Vehicle Communication Next, an outline of an automated merging system using road-to-vehicle communication will be explained on the assumption of merging from a ramp way to a main line at an interchange of a highway.

The automated merging system is based on the automated lane change (PALS) function by the above-described automated driving controller 10, generates a target path by using other vehicle information in a merged lane (main line) obtained by road-to-vehicle communication, performs acceleration/deceleration control (longitudinal control) and steering control (lateral control), performs automated merging (merging support) to the merged lane, and is composed of a vehicle side system and a road side system.

The vehicle side system includes the automated driving controller 10 constituting the automated lane change system (PALS), a communicator 16 for receiving other vehicle information by road-to-vehicle communication, and software for performing surrounding recognition in the environmental condition estimating part 11 and target path generation in the path generating part 12 on the basis of the received other vehicle information.

Figure 5A:
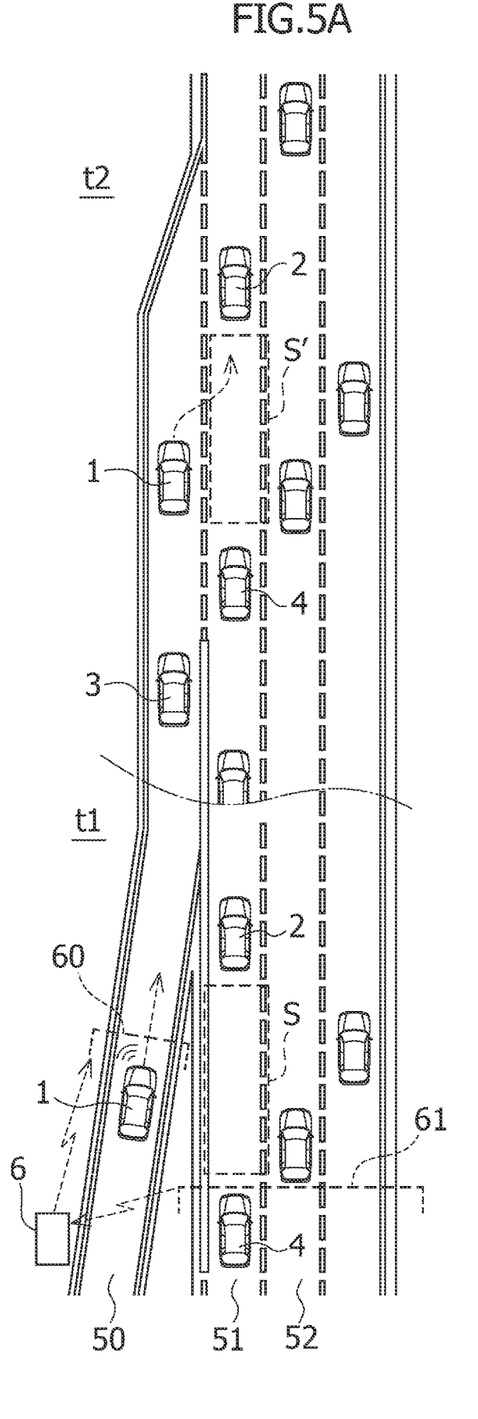
FIG. 5A is a schematic plan view exemplifying merging support by road-to-vehicle communication.

As shown in FIG. 5A, the road side system includes a detection apparatus 61 (such as a camera) for detecting vehicles in a merged lane 51 (and neighboring lane 52) of the main line of the highway upstream of a merging point, a processing apparatus 6 for analyzing information obtained by the detection apparatus 61 and generating other vehicle information such as positions and speeds of vehicles driving in the merged lane 51 (and neighboring lane 52) and inter-vehicle distance and arrival time to the merging point estimated from those, and a roadside communicator 60 for distributing the other vehicle information to vehicles driving in a merging lane 50 (rampway) by road-to-vehicle communication.

FIG. 5A makes display for convenience in combination of a first time t1 (lower side) when a vehicle 1 is driving on the ramp way of the merging lane 50 and a second time t2 (upper side) when the same vehicle 1 has reached near a merging point of an acceleration lane; at the first time t1, the vehicle 1 that has received the other vehicle information from the roadside communicator 60 with the communicator 16 performs speed control and path generation to the merging point on the basis of the other vehicle information by the automated driving controller 10, performs steering control for path following while blinking the turn signal in a state in which the vehicle is accelerating to the target speed before arriving the merging point at the second time t2, and performs automated merging to an inter-vehicle space S' in the merged lane 51.

The road-to-vehicle communication is made redundant in a case in which there is occurrence of system failure, such as failure of the communicator or communication failure and, for example, dual measures of radio/optical communication are taken. Furthermore, in the case of disruption of road-to-vehicle-communication during automated merging driving, steering control and speed control (inter-vehicle control) for automated merging can be continued on the basis of detection information of the external sensor 21 of the vehicle 1 itself.

Override Function

The automated merging system has an override function for stopping automated merging and switching to manual driving by the driver's acceleration/deceleration operation intervention or manual steering intervention during automated merging using road-to-vehicle communication.

That is, if an engine torque request by accelerator pedal operation of the driver or a deceleration request by brake pedal operation is equal to or greater than a corresponding override threshold value, override is reached. These override threshold values are set to an accelerator operation amount (engine torque command value) or a brake operation amount (ESP hydraulic command value) based on which it is determined that the driver has intentionally performed acceleration/deceleration operation, and both are set according to the acceleration/deceleration characteristic and driving state of the vehicle.

If a steering torque (or steering angular velocity) by the driver's manual steering 34 is equal to or greater than the override threshold value, override is reached. The override threshold value by steering intervention is set according to the steering characteristics and driving state of the vehicle.

Excessive Operation Prevention Control at Occurrence of Communication Failure During Automated Merging If failure occurs in road-to-vehicle communication during merging support by the automated merging system, the automated merging system tries to continue automated merging (automated lane change) on the basis of the detection information of the external sensor 21; when it cannot continue automated lane change due to the movement of other vehicles or the like, the driver is notified of automated lane change function stop advance notice and an operation takeover request, and fallback control of the automated lane change function is started after the elapse of several seconds; at that time, if shift to manual driving is performed due to override by excessive steering operation or override by excessive brake operation/accelerator operation by the driver who is overwhelmed by the notification of automated lane change stop and operation takeover, the vehicle may get close to a following vehicle or get close to a vehicle in a neighboring lane due to lane departure, as described above.

The automated driving controller 10 according to the present invention has an excessive operation prevention function that, at the same time as occurrence of failure or at the same time as the notification of the automated lane change stop and operation takeover request when failure occurs in road-to-vehicle communication during merging support by the automated merging system, changes the override threshold values (accelerator override threshold value serving as a determination criterion of accelerator operation intervention, brake override threshold value serving as a determination criterion of brake operation intervention, and steering override threshold value serving as a determination criterion of steering operation intervention) to a value greater than during normal operation.

By increasing the override threshold values at the time of occurrence of failure (or the notification of the automated lane change stop and operation takeover request), override is avoided and speed control and automatic steering are continued, thereby excessive acceleration/deceleration and steering are suppressed, and getting close to a following vehicle and lane departure can be prevented even if the driver who is overwhelmed by the notification of the automated lane change stop and operation takeover performs excessive accelerator/brake operation intervention or steering intervention and applies a large operation amount that would lead to acceleration/deceleration or lane departure before threshold value change.

1. Accelerator/Brake Override Threshold Value

First, an excessive operation prevention function by changing the accelerator/brake override threshold value will be described below. An excessive steering prevention function by changing the steering override threshold value will be described later.

As described previously, the automated merging using road-to-vehicle communication is based on the automated lane change system (PALS) and implemented by combining longitudinal control (speed control and inter-vehicle distance control) by the ACC controller 14 and lateral control (target path following control) by the LKA controller 15. Therefore, the accelerator/brake override threshold value is set as follows according to the override threshold value of the ACC function.

Accelerator Override Threshold Value when Communication Function is Normal

If an engine torque command value by the driver's accelerator depression is greater than an engine torque command value for maintaining ACC set speed (cruise set speed or vehicle ahead following speed) or ACC set acceleration, accelerator override is reached and the driver's accelerator operation is given priority. The threshold value is obtained from an engine torque map set according to a vehicle speed and gear position, and an engine torque command value that gives acceleration corresponding to, for example, a speed of 4 km/h, to the ACC set speed or an engine torque command value causing acceleration corresponding to 0.3 m/s$^2$ to the ACC set acceleration is set as a threshold value Td.

Brake Override Threshold Value when Communication Function is Normal

If an ESP hydraulic command causing deceleration with respect to the ACC set speed (cruise set speed or vehicle ahead following speed) or ACC set acceleration is given by the driver's brake depression, brake override is reached and the driver's brake operation is given priority. An ESP hydraulic command value that causes deceleration corresponding to, for example, a speed of 2 km/h with respect to the ACC set speed or an ESP hydraulic command value that causes deceleration corresponding to 0.2 m/s$^2$ with respect to the ACC set acceleration is set as a threshold value Pd.

Accelerator Override Threshold Value when Communication Failure Occurs

A value greater than the ACC accelerator override threshold value during normal operation, preferably in the range of 120% to 250%, and more preferably in the range of 150% to 220% of the ACC accelerator override threshold value during normal operation is selected. For example, an engine torque command value that gives acceleration corresponding to a speed of 8 km/h with respect to the ACC set speed or an engine torque command value that causes acceleration corresponding to 0.6 m/s² with respect to the ACC set acceleration is set as a threshold value To.

Brake Override Threshold Value when Communication Failure Occurs

A value greater than the ACC brake override threshold value during normal operation, preferably in the range of 120% to 250%, and more preferably in the range of 150% to 220% of the ACC brake override threshold value during normal operation is selected. For example, an ESP hydraulic command value that causes deceleration corresponding to a speed of 4 km/h with respect to the ACC set speed or an ESP hydraulic command value that causes deceleration corresponding to 0.4 m/s² with respect to the ACC set acceleration is set as a threshold value Po.

2. Steering Override Threshold Value

Figure 5B:
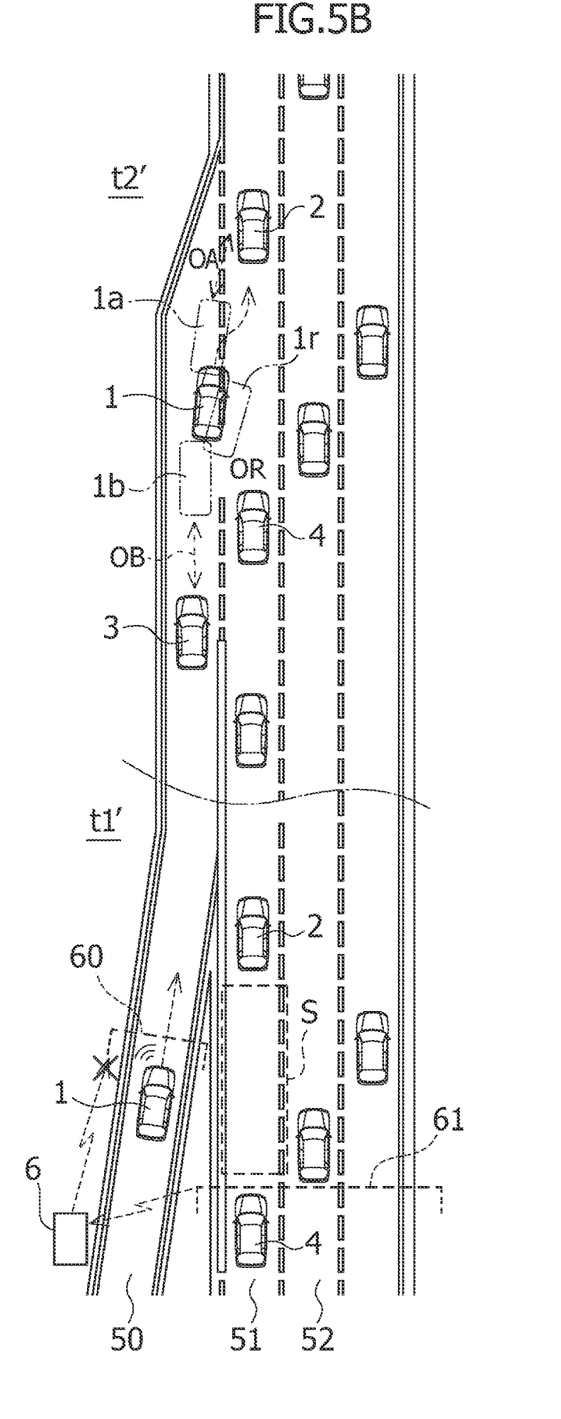
FIG. 5B is a schematic plan view exemplifying excessive operation/steering override at the time of occurrence of communication failure during merging support and prevention control thereof.

The excessive steering prevention function by the steering override threshold value change will be described below. In the following, steering that gives a lateral displacement in the same direction as lane change from the merging lane 50 to the merged lane 51 (generally right steering on the highway as shown in FIGS. 5A and 5B) is referred to as additive steering and steering that gives a lateral displacement in the opposite direction to lane change to the merged lane 51 (generally left steering on the highway as shown in FIGS. 5A and 5B) is referred to as subtractive steering.

Steering Override Threshold Value when Communication Function is Normal

For an additive steering override threshold value when road-to-vehicle communication is normal, a steering torque (steering torque calculated from the vehicle speed-steering angle-steering torque map) corresponding to a steering angle by which a virtual lateral displacement "y't" for reaching a virtual lateral position after "t" seconds becomes "yt+α" is set as an additive steering override threshold value T1*d*, where "α" is a constant determined based on vehicle speed.

In the case of subtractive steering, a value that is perceptible (determined by the steering angle, steering angle speed, or the like) and is applied in a direction of reducing the steering torque to a value (steering torque target value) obtained by converting a steering angle by which a virtual lateral displacement "yt" for reaching a virtual lateral position after "t" seconds becomes "yt+α" into a steering torque is set as a subtractive steering override threshold value T2*d*, where "α" is a constant determined based on vehicle speed.

Steering Override Threshold Value when Communication Failure Occurs

For an additive steering override threshold value, a value obtained by converting a steering angle calculated from a virtual lateral displacement "y"t" (=yt+β, where β>α) when communication failure occurs and the movement characteristics of the vehicle with respect to the virtual lateral displacement "yt" when the communication function is normal into a steering torque is set as an additive steering override threshold value T1*o*.

For a subtractive steering override threshold value, a value obtained by converting a steering angle calculated from the virtual lateral displacement "y"t" (=yt−γ, where "γ" is greater than a lateral displacement corresponding to a steering torque X' Nm) when communication failure occurs and the movement characteristic of the vehicle with respect to the virtual lateral displacement "yt" when the communication function is normal into a steering torque is set as a subtractive steering override threshold value T2*o*.

Figure 4:
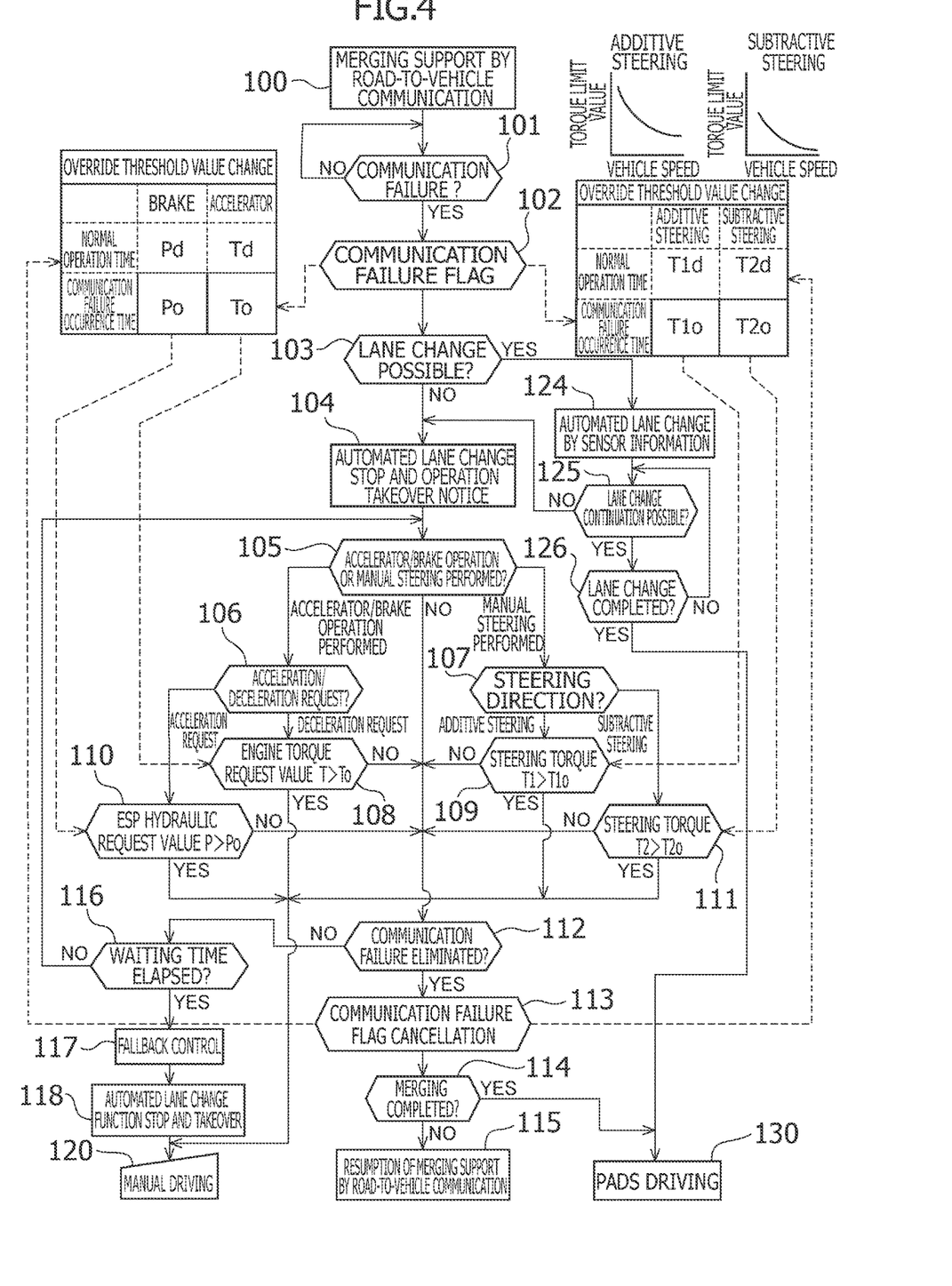
FIG. 4 is a flowchart showing prevention control of override due to excessive operation intervention at a time of occurrence of communication failure during merging support by road-to-vehicle communication.

Excessive Operation Prevention Flow when Communication Failure Occurs During Merging Support Next, an excessive operation prevention flow by override threshold value change when failure occurs in road-to-vehicle communication during merging support by the automated merging system will be described with reference to FIG. 4.

(1) Merging Support by Road-to-Vehicle Communication

The merging support by the automated merging system is to receive other vehicle information by road-to-vehicle communication with the roadside communicator 60 and perform speed control and path generation to the merging point on the basis of the other vehicle information in a state of activation of the ACCS (speed and inter-vehicle distance control) and the LKAS (steering control) of the vehicle 1 driving in the merging lane 50 (ramp way) as shown in FIG. 5A (step 100).

(2) Communication Failure Determination

During activation of the automated merging system, it is constantly monitored and determined whether communication failure due to failure of the communicator itself, radio wave failure, or the like occurs by the abnormality detection function of the communicator 16 (step 101).

(3) Communication Failure Flag

If it is determined that communication failure has occurred, a communication failure flag is set (step 102).

(4) Override Threshold Value Change

At the same time, the accelerator override threshold value Td and brake override threshold value Pd when the communication function is normal are altered to the accelerator override threshold value To (To>Td) and brake override threshold value Po (Po>Pd) when communication failure has occurred, respectively.

At the same time, the steering override threshold values (additive direction T1*d* and subtractive direction T2*d*) when the communication function is normal are altered to the steering override threshold values (additive direction T1*o* and subtractive direction T2*o*) when communication failure has occurred. More strictly, a calculation expression (coefficient) for calculating the steering override threshold values are changed from that when the communication function is normal to that when communication failure has occurred, and is updated according to the vehicle's moving state.

(5) Lane Change Determination

At the same time as occurrence of communication failure, it is detected whether there is another vehicle in a predetermined range around the vehicle itself by the external sensor 21, and determined whether to perform automated lane change to the merged lane 51 on the basis of the detection information of the external sensor 21 (step 103).

(6) Automated Lane Change by Sensor Information

If there is no other vehicle in the predetermined range around the vehicle itself, automated lane change to the merged lane 51 is started (step 124). Also after the automated lane change start, it is monitored whether there is intrusion of other vehicles to the predetermined range around the vehicle itself by the external sensor 21 and whether to continue automated lane change on the basis of that (step 125), and when merging to the main line by automated lane change is completed (step 126), shift to PADS driving in the merged lane 51 is performed (step 130).

(7) Automated Lane Change Stop and Operation Takeover Notice

On the other hand, there is another vehicle in the predetermined range around the vehicle itself and it is determined that automated lane change cannot be performed in step 103 and it is determined that automated lane change cannot be continued in step 125, the driver is notified of the occurrence of communication failure, lane change stop, and operation takeover by display in a head-up display or meter panel or voice (step 104). At the same time, counting of a waiting time until shift to fallback control of the speed and inter-vehicle distance control (ACC function) and the automated steering function is started.

(8) Determination of Whether Accelerator/Brake Operation and Manual Steering are Performed At this time point, the speed and inter-vehicle distance control (ACC function) and the automated steering function are still operating, and whether accelerator operation or brake operation is performed by the driver is determined with position sensors attached to accelerator and brake pedals, and at the same time, whether manual steering 34 is performed is determined with a torque sensor attached to the EPS controller 31 (step 105).

(9-1) Acceleration/Deceleration Request Determination

In step 105, when the accelerator operation or brake operation by the driver is detected, it is determined whether the override by the driver is an acceleration request or a deceleration request (step 106).

(9-1a) Accelerator Override Determination

In the case of the acceleration request, the engine torque command value by the driver's accelerator depression is compared with the override threshold value To (step 108).

i) If the engine torque command value T>the override threshold value To, it is determined that the operation is accelerator override and the override is carried out immediately, shifting to manual driving (step 120).

ii) If the engine torque command value T To, the override is not carried out, and ACC and automated steering continue.

(9-1b) Brake Override Determination

In the case of the deceleration request, the ESP hydraulic command value by the driver's brake depression is compared with the override threshold value Po (step 110).

i) If the ESP hydraulic command value P>Po, it is determined that the operation is brake override and the override is carried out immediately, shifting to manual driving (step 120).

ii) If the ESP hydraulic command value P Po, the override is not carried out, and ACC and automated steering continue.

(9-2) Steering Direction Determination

On the other hand, in step 105, when it is determined that manual steering is performed from a detection value of the torque sensor attached to the EPS controller 31, a steering direction of the manual steering 34 is determined (step 107).

For the determination of the steering direction, it is determined to be additive steering if the torque is applied in a direction of increasing the steering torque with respect to the steering torque value that gives a lateral displacement for path following in automated lane change, and it is determined to be subtractive steering if the torque is applied in a direction of decreasing the steering torque.

(9-2a) Additive Steering Override Determination

If the steering direction is determined to be additive steering in the steering direction determination, the steering torque is compared with the additive steering override threshold value T1o (step 109).

i) If the steering torque>the additive steering override threshold value Tlo, it is determined that the operation is override and the override is carried out immediately, shifting to manual driving (step 120).

ii) If the steering torque the additive steering override threshold value Tlo, the override is not carried out, and ACC and automated steering continue.

(9-2b) Subtractive Steering Override Determination

If the steering direction is determined to be subtractive steering in the steering direction determination, the steering torque is compared with the subtractive steering override threshold value T2o (step 111).

i) If the steering torque>the subtractive steering override threshold value T2o, it is determined that the operation is override, and the override is carried out immediately, shifting to manual driving (step 120).

ii) If the steering torque the subtractive steering override threshold value T2o, the override is not carried out, and ACC and automated steering continue.

(10) Communication Failure Elimination Determination

After determining that communication failure has occurred in step 102, it is constantly monitored whether communication failure has been occurring or communication failure is eliminated by the abnormality detection function of the communicator 16 (step 112).

(11) Communication Failure Flag Cancellation

When communication failure is eliminated during continuation of ACC and automated steering, the failure flag is cancelled, and each override threshold value returns to a value when the communication function is normal (step 113).

(12) Merging Support Resumption by Road-to-Vehicle Communication

It is determined whether merging (lane change) to the merged lane 51 is completed when communication failure is eliminated during continuation of ACC and automated steering (step 114), and if merging (lane change) is not completed (or not started), merging support by road-to-vehicle communication is resumed (step 115). On the other hand, if merging (lane change) is completed, shift to PADS driving is performed (step 130).

(13) Manual Driving

If it is determined that communication failure has occurred in step 102, and the communication failure is not eliminated even after the elapse of a predetermined time after notifying the driver of the occurrence of communication failure, lane change stop, and operation takeover in step 104 (step 116), the speed and inter-vehicle distance control (ACC function) and the automated steering function shift to fallback control (step 117), the automated lane change function is stopped, and steering and braking/driving operation is taken over by the driver (step 118), shifting to manual driving (step 120).

Although override by excessive steering when communication failure occurs can be basically prevented by the override threshold value change as described above, if the manual steering is equal to or greater than the override threshold value in the above-described override determination (step 109 or 111), the ACC and automated steering functions will be overridden by the manual steering.

When the override threshold value is altered when communication failure occurs (step 102), by changing an upper limit value of the steering torque or steering angle (in inverse proportion to vehicle speed/decreases as vehicle speed increases) set according to vehicle speed by the EPS controller 31 to a value lower than when the communication function is normal, excessive steering can be prevented when it is overridden by the manual steering.

When the override threshold value is altered when communication failure occurs (step 102), by changing a steering gain of the manual steering to a small value by the EPS controller 31, it is also possible to partially reflect the steering amount on the steering torque when it is overridden by the manual steering.

Operation and Effects As detailed above, because the driving control apparatus for the vehicle according to the present invention is configured so that the override threshold values serving as a determination criterion of operation intervention for stopping the speed and inter-vehicle distance control (ACC function) and the automated steering function are altered to a greater value than when the communication function is normal if communication failure occurs during merging support using road-to-vehicle communication, excessive operation prevention effects exemplified below can be expected.

For example, as shown in Figure SA, the vehicle 1 receives other vehicle information (vehicles 2 and 4, inter-vehicle space S2, and the like) in the merged lane 51 from the roadside communicator 60 at a first time t1, and performs speed control and path generation to a merging point on the basis of the other vehicle information; but as shown in FIG. 5B, when communication failure occurs at a first time t1' and the other vehicle information in the merged lane 51 cannot be acquired, the vehicle tries to continue automated merging (automated lane change) by sensor information of the vehicle 1 at a second time t2', but if it is determined that automated merging by the sensor information cannot be continued due to movement of other vehicles or the like, the driver is notified of automated lane change function stop advance notice and an operation takeover request, and fallback control of the automated lane change function is started after the elapse of several seconds.

At this time, even if the driver who is overwhelmed by the notification of the occurrence of communication failure, automated merging stop, and operation takeover request performs excessive steering operation or braking/driving operation, because the steering override threshold values and the accelerator/brake override threshold values serving as the determination criterion of operation intervention are altered to a value greater than when the communication function is normal, override can be avoided, which enables shift to fallback control in the state in which the speed and inter-vehicle distance control (ACC function) and the automatic steering function are continuing as shown in FIG. 5B, and can prevent right lane departure (OR) due to excessive steering intervention and getting close to other vehicles in the neighboring lane, and getting close to a preceding vehicle 2 (OA) or getting close to a following vehicle 3 (OA) due to excessive operation intervention.

The embodiment shows the case in which both ACC function (longitudinal control) and automatic steering function (lateral control) shift to fallback control when communication failure occurs, but it is possible to cause only the automatic steering function (lateral control) to shift to fallback control.

Although the embodiment has described in the case in which the accelerator override threshold value is set based on the engine torque request by the driver's accelerator pedal operation, the accelerator override threshold value can also be configured to be set based on the driver's accelerator pedal depression, that is, an accelerator pedal position.

In the same manner, although the embodiment has described the case in which the brake override threshold value is set based on the deceleration request by the driver's brake pedal operation, the brake override threshold value can also be configured to be set based on the driver's brake pedal depression, that is, a brake pedal position.

Although the embodiment has exemplified the case in which the steering override threshold value is set based on the steering torque, the steering override threshold value can also be configured to be set based on the steering angle, steering angle speed, or the like.

Although some embodiments of the present invention have been described above, the present invention is not limited to these embodiments, and various modifications and changes are possible within the scope of the present invention.

What is claimed is:

1. A driving control apparatus for a vehicle, comprising:
an environmental condition estimating part including a surrounding recognition function for recognizing a vehicle's lane and neighboring lanes and other vehicles in the respective driving lanes, a function for obtaining the vehicle's moving state, and a communication function for obtaining other vehicle information in a merged lane;
a path generating part for generating a target path on the basis of information obtained by the environmental condition estimating part; and
a vehicle control part for performing acceleration/deceleration control and steering control for causing the vehicle to follow the target path, and having:
a function for generating a target path to a predetermined range as a target and performing automated lane change to a neighboring lane when no other vehicle is recognized in the predetermined range of the neighboring lane by the surrounding recognition function; and
a merging support function for generating a target path by using the other vehicle information obtained by the communication function, performing acceleration/deceleration control and steering control, and automatically merging to the merged lane;
wherein, the driving control apparatus has a function for altering override threshold values serving as a determination criterion of operation intervention for stopping the acceleration/deceleration control and the steering control to a value greater than during normal operation of the communication function when failure occurs in the communication function during the automated merging.

2. The driving control apparatus for the vehicle according to claim 1, wherein, when failure occurs in the communication function during the automated merging, if it is possible to merge by automated lane change based on the surrounding recognition function, merging by the automated lane change is continued, and if it is not possible to merge by automated lane change based on the surrounding recognition function or if it is not possible to continue, a driver is notified of automated lane change function stop and operation takeover, shifting to fallback control of the automated lane change function.

3. The driving control apparatus for the vehicle according to claim 2, wherein, when failure of the communication function is not eliminated within a predetermined time after failure occurs in the communication function during the automated merging, shift to fallback control of the automated lane change function is configured to be performed.

4. The driving control apparatus for the vehicle according to claim 2, wherein, when failure of the communication function is eliminated within a predetermined time after failure occurs in the communication function during the automated merging, the override threshold values serving as the determination criterion of operation intervention for stopping the acceleration/deceleration control and the steering control are configured to be returned to a value during normal operation of the communication function.

5. The driving control apparatus for the vehicle according to claim 4, wherein, when failure of the communication function is eliminated within the predetermined time after failure occurs in the communication function during the automated merging, if merging to the merged lane is not completed, automated merging using the other vehicle information obtained by the communication function is configured to be resumed.

6. The driving control apparatus for the vehicle according to claim 1, wherein, when failure of the communication function is eliminated within a predetermined time after failure occurs in the communication function during the automated merging, the override threshold values serving as the determination criterion of operation intervention for stopping the acceleration/deceleration control and the steering control are configured to be returned to a value during normal operation of the communication function.

7. The driving control apparatus for the vehicle according to claim 6, wherein, when failure of the communication function is eliminated within the predetermined time after failure occurs in the communication function during the automated merging, if merging to the merged lane is not completed, automated merging using the other vehicle information obtained by the communication function is configured to be resumed.

8. The driving control apparatus for the vehicle according to claim 1, wherein the override threshold values include an accelerator override threshold value serving as a determination criterion of accelerator operation intervention and/or a brake override threshold value serving as a determination criterion of brake operation intervention.

9. The driving control apparatus for the vehicle according to claim 1, wherein the override threshold values include steering override threshold values serving as a determination criterion of steering operation intervention, the steering override threshold values including an additive steering override threshold value in the same direction as lane change to the merged lane and a subtractive steering override threshold value in an opposite direction to lane change to the merged lane, different values set to the additive steering override threshold value and the subtractive steering override threshold value.

\* \* \* \* \*